UNITED STATES PATENT OFFICE.

ALFRED ROBINSON, OF NEW YORK, N. Y., ASSIGNOR TO READY ROOFING COMPANY.

IMPROVEMENT IN ROOFING FABRICS.

Specification forming part of Letters Patent No. 44,220, dated September 13, 1864; reissue No, 4,862, dated April 9, 1872.

*To all whom it may concern:*

Be it known that I, ALFRED ROBINSON, of the city and State of New York, have invented an Improvement in Roofing Fabric, and the following is declared to be a correct description thereof.

Before my invention, woven material had been employed as a roofing fabric, but, in consequence of the costliness of heavy, close cloth, the common bagging or burlap was mostly made use of. This fabric was saturated with bituminous material, but when exposed to the heat of the sun the bituminous material usually subsided and percolated through the fabric to the lowest places, leaving the higher portions of the fabric exposed either to the action of the weather and liable to rot, or else there were openings at the interstices of the fabric. In other instances the woven fabric had been saturated with bituminous material and covered on one or both sides with paper, but into this the tarry or bituminous material soaked but little, and hence such bituminous material was liable to percolate along the woven fabric to the lowest point and cease to be of uniform quality. Besides this, such roofing fabric is costly.

A material known as roofing-felt had also been known, which consisted of a single layer of paper saturated with bituminous material; but this was not thick enough for roofing purposes unless one layer was laid upon the roof and a coating of bituminous material applied thereto, and then a second sheet, and so on. This operation was difficult, particularly on sloping roofs, and the fabric was very imperfect and unreliable because of lack of uniformity.

The nature of my said invention consists in a roofing fabric composed of two or more layers of paper saturated with bituminous material, and caused to adhere together by an interposed layer of bituminous material so as to form a complete and uniform sheet of the required thickness and strength, and ready for use. The roofing fabric made in this manner is very cheap, durable, and uniform in quality, and when exposed to the action of the sun the bituminous material does not run; the fibers of the paper retain the same, and there are not any interstices, as in the woven cloth. Hence this improved roofing fabric is free from the objections heretofore arising, as before mentioned.

I spread upon the sheet of paper a layer of bituminous material of the proper fluidity, and the same is preferable when heated; and a second sheet of paper is applied thereto, and so on, until the required thickness is obtained; and the bituminous material causes the sheets to adhere to each other as well as filling the pores. The bituminous material should penetrate the entire fabric of the paper, and the bituminous material that causes the layers to adhere is to be of the proper quality to accomplish the desired object, so that there may not be risk of softening and running. It is preferable to make use of thin but strong paper, and of a quality that is easily penetrated or saturated by the bituminous material; and the roofing fabric made in this manner is a new article of manufacture, possessing the properties requisite for withstanding the action of the atmosphere, and remaining homogeneous under the usual circumstances of use, and the fabric is complete, ready for use or sale; and the unequal or defective lapping and cementing of the layers upon the roof are avoided.

I claim as my invention—

The roofing fabric, made in sheets, with two or more layers of paper and bituminous material, substantially as specified.

Signed this 9th day of March, 1872.

ALFRED ROBINSON.

Witnesses:

GEO. T. PINCKNEY,

CHAS. H. SMITH.